3,070,639
SEPARATION OF AROMATIC HYDROCARBONS USING SURFACE-MODIFIED SOLID ADSORBENT

Marcellus J. Geerts, Evanston, and John W. Walsh and Hillis O. Folkins, Crystal Lake, Ill., assignors to The Pure Oil Company, Chicago, Ill., a corporation of Ohio
No Drawing. Filed Dec. 15, 1959, Ser. No. 859,565
9 Claims. (Cl. 260—674)

This invention relates to new and useful improvements in processes for the selective adsorption of polar organic compounds from non-polar organic compounds by means of an improved adsorbent composition. More particularly, this invention relates to a method of treating a solid metal oxide gel, such as silica gel, alumina, or silica-alumina, to provide an enhanced adsorptive capacity for polar organic compounds, particularly polar hydrocarbons, such as aromatic hydrocarbons, which make possible the separation of polar from non-polar compounds with increased efficiency.

An object of this invention is to provide an improved method for the preparation of a metal oxide adsorbent and an improved process utilizing the adsorbent for separation of polar organic compounds from non-polar organic compounds.

Another object of this invention is to provide an improved method for preparation of a metal oxide adsorbent which is more selective in the adsorption of aromatic hydrocarbons from mixtures of aromatic and non-aromatic hydrocarbons, and a process of separation utilizing the adsorbent so prepared.

A feature of this invention is the provision of an improved process for the separation of polar organic compounds from non-polar organic compounds by contact with a solid metal oxide adsorbent, such as silica gel, alumina, or silica-alumina, which has been treated in the dry state with a solution of a reactive compound and heated at a temperature of 500°–1000° F. to effect reaction with the surface hydroxyl groups in the adsorbent to produce an adsorbent having an enhanced surface-area index and adsorptive capacity for polar organic compounds.

Other objects and features of this invention will become apparent from time to time throughout the specification and claims as hereinafter related.

This invention is based upon our discovery that polar organic compounds may be separated more effectively from non-polar organic compounds by selective adsorption on a solid adsorbent, such as silica gel, alumina, or silica-alumina, which has been treated with a compound selected from the group consisting of oxides, hydroxides, and thermally-decomposable salts of metals of groups I, II, III, and IV of the periodic table, and subsequently heated to a temperature in the range from about 500°–1000° F. until reaction with the hydroxyl groups in the adsorbent is complete. The adsorbent which is prepared in this manner has an enhanced surface-area index and a greater capacity for selective adsorption of polar organic compounds, particularly polar hydrocarbons, such as benzene and toluene.

Solid metal oxide gels, such as silica gel, alumina, and silica-alumina, are well known as catalysts and as supports in catalyst compositions and have also been used to a considerable extent in selective adsorption processes for separation of polar organic compounds from non-polar organic compounds. In a metal oxide gel, there are many free hydroxyl groups existing on the surfaces of the gel. At elevated temperatures, these hydroxyl groups are driven off in the form of water from the gel, usually resulting in sintering or other deleterious effects. We have found that when silica gel, alumina, or silica-alumina, in the form of a dried hydrogel, is treated with a solution (or otherwise impregnated with the desired compounds) of hydroxides, oxides, or thermally-decomposable salts of metals of groups I, II, III, and IV of the periodic table, which are basic to the hydrogen atom in the hydroxyl groups of the hydrogel, or with salts of acids weaker than the hydrogen atoms of the gel hydroxyl groups, and heated at temperatures of about 500°–1000° F., these compounds react with the surface hydroxyls to release water and form stable metal-to-oxygen linkages within the gel. The resulting compositions have greatly enhanced surface-area indexes over conventionally-prepared metal oxide or mixed oxide hydrogel compositions, are improved in thermal stability, and have a greater adsorptive capacity for removal of polar organic compounds from non-polar organic compounds. The compositions which are prepared in this manner are eminently suitable as adsorbents for removal of benzene or toluene, or other polar organic compounds, from non-polar organic compounds.

In this invention, the enhancement of surface-area index and adsorptive capacity of adsorptive gels is essentially limited to silica gel, alumina, and silica-alumina. The improved adsorbent compositions are prepared by reacting the hydroxyl groups of the gels with an oxide, hydroxide, or thermally-decomposable salt of a selected element. In general, any element capable of being deposited on the gel surfaces as an oxide or hydroxide basic to the hydrogen atom in the hydroxyl groups of the gel, or as a salt of an acid weaker than the hydrogen atoms of the gel hydroxyl groups, can be used. However, it appears that bivalent elements are most effective and least likely to interject undesirable side-effects. The reaction with surface hydroxyls is conducted at an elevated temperature of the order of 500°–1000° F., preferably of about 750°–975° F., at which temperature the reaction mass is maintained for a sufficient length of time to reach completion of reaction. Pressure does not appear to affect the process, but it is possible that it might be desirable in some instances to use superatmospheric pressure to prevent decomposition of a hydroxide before reaction. The success of this process depends upon the presence of a substantial number of reactive hydroxyl groups on or in the gel structure at the time the modifying compound is added. Consequently, it is essential that the gel has not been heated to a temperature prior to this treatment which is sufficient to drive off structural hydroxyl groups in the form of irreversible water. It is known that heating can drive off structural hydroxyl groups in the form of irreversible water, and that once driven off, the hydroxyl groups cannot be replaced. By way of illustration, we have found that little or no benefit is gained by treating a "catalyst-grade" silica gel which in its preparation has been calcined at about 1200° F. On the other hand, very substantial improvement is gained by treating a silica gel or silica-alumina which has been spray-dried at an average bulk temperature of about 800° F. Because the effectiveness of this method is inversely proportional to the temperature to which the gel has been previously subjected, and to the extent to which structural hydroxyl groups have been removed as irreversible water, maximum benefit is gained in treating gels which have not been heated sufficiently to drive off any irreversible water. For example, we have found that irreversible water begins to be driven from silica-alumina gels at about 500° F. Consequently, it is preferred to treat silica-alumina hydrogels (or alumina, or silica gels) before they have been heated to temperatures in excess of about 500° F. It is noted, however, that some improvement is gained even in the case of gels which have been heated in the range from 500°–800° F.

In general, our process involves only the reaction of gel hydroxyl groups capable of reacting to form and eliminate water or an acid with the selected compound, in accordance with the process which will be subsequently described. Consequently, the maximum amount of compound added is just sufficient to react with all of the surface hydroxyl groups. However, it is probable that less than the maximum reactive amount of compound should be used in many instances where the acidity of the gel affects the adsorptive capacity. Thus, we have found that amounts as small as about 1% of the reactive maximum (although 10–40% is preferred) are effective in gaining increased surface-area index and adsorptive capacity.

In carrying out this invention, we have determined the maximum amount of the compound to be incorporated in the gel structure by ascertaining through experiments the amount of irreversible water lost by the gel when it is heated to the maximum temperature at which it is to be treated or used. Of course, the total amount of irreversible water removable from the gel can be determined by completely sintering it, but this is usually neither needed nor desirable. Then, having determined the requisite amount of water, an amount of hydroxide, salt, or oxide, from about 1 to 100% of the stoichiometric equivalent of the hydroxyl groups required to form that amount of water, is added. It can be seen that when the hydroxide or oxide of a monovalent element is used, the maximum number of molar equivalents of the compound is twice the number of mols of irreversible water eliminated from the gel. When a hydroxide or oxide of a divalent element is used, the maximum number of molar equivalents of the compound is equal to the number of mols of irreversible water eliminated. Because compounds of elements having valences greater than 2 usually can react with only 2 hydroxyl groups, the maximum number of molar equivalents of these compounds usually is equal to the number of mols of irreversible water eliminated. It appears probable that the structure of certain gels will be such that more than 2 hydroxyl groups can combine with 1 mol of the compound, in which case fewer molar equivalents of the compound are used.

Specifically, with a hydroxide, or oxide, the number of hydroxyl groups capable of forming irreversible water by reaction with the surface hydroxyls of a particular gel, and the maximum amount of the element to be incorporated in accordance with this invention can be readily determined. A quantity of a gel to be tested and treated is place in a suitable vessel and dried to a constant weight at a particular elevated temperature by passing a stream of dry inert gas through the bed. Then, the temperature is increased slowly to a higher fixed temperature while passing dry inert gas through the bed, and when constant weight at the higher temperature has been reached, the sample is isolated and weighed. The sample is then rehydrated at the first temperature by contact with a humidified inert gas, whereupon the weight increases to an equilibrium value. The gel is then heated in a dry gas stream at the first temperature and weighed after equilibrium is again reached. This sequence is repeated, heating the gel incrementally to higher temperatures during each repetition, until a "critical" temperature is eventually reached at which the gel does not regain its full weight upon rehumidification and drying at the next lower temperature. Thereafter, the gel is heated to the highest temperature at which the adsorbent composition is to be used and/or heated, is rehydrated by contact with rehumidified inert gas, and dehydrated by contact with dry inert gas at the "critical" temperature. The difference between the final weight and the initial weight at that temperature is the amount of irreversible water removed from the sample by heating it to the highest temperature. From the quantity of irreversible water removed, it is simple to calculate the amount of hydroxyl groups which produced this quantity of water, and which is therefore available for reaction with a metal oxide, hydroxide, or metal compound in accordance with this invention.

In preparing adsorptive oxide compositions in accordance with this invention, any method capable of bringing the hydroxide, oxide, or salt of the selected element into intimate contact with the surface hydroxyls in the gel can be used. For example, where the hydroxide, oxide, or salt of the element is water-soluble, and reactive with the hydroxyls of the gels, the gel can be impregnated with an aqueous solution (or other solution) containing the requisite amount of the compound, using a volume of solution equivalent to the adsorptive capacity of the gel, after which the resulting wet mixture is dried and heated to 500°–1000° F., preferably 750°–975° F., until reaction is complete (completion of reaction is evidenced by cessation of evolution of water or acid vapors). In cases where the reactive oxides, hydroxides, and salts of the selected elements are unstable or insoluble in water, the gel is slurried into an aqueous solution containing the requisite amount of a water-soluble salt (unreactive with the surface hydroxyls of the selected adsorbents), and ammonia or other base is added to precipitate the hydroxide or oxide of the element on the gel surfaces. Then, the slurry is filtered, the filter cake is dried at about 230° F., and the dried filter cake is heated to 500°–1000° F., preferably to about 750°–975° F., until reaction is complete, as evidenced by cessation of evolution of water or acid vapors. In general, the latter method is preferred, even where the reagents can be incorporated by impregnation with aqueous solutions (solvents other than water may be used for either procedure, e.g., methanol) because of the superior distribution and intimacy of contact of the precipitate from the compound and the gel surfaces.

The utility of this invention in increasing the surface-area index of refractory metal oxide gels, and in providing an adsorption process using the resulting product, has been demonstrated experimentally. When adsorptive metal oxides are treated in accordance with this invention, the surface-area index is increased substantially and the resulting adsorbent has a higher capacity for adsorption of polar organic compounds, such as benzene or toluene, from mixtures of polar and non-polar organic compounds.

In a series of experiments, a silica-alumina hydrogel, which had been spray-dried at an average temperature of about 800° F., was subjected to incremental heating, drying, and rehumidification, as previously described, to determine the amount of irreversible water lost at elevated temperatures. The irreversible water content was found to be about 3.46 g., or 0.192 mol, per 100 g. of silica-alumina. This of course is equal to 0.384 mol of hydroxyl groups available for reaction in the dried hydrogel. The silica-alumina (containing 75% wt. silica and 25% wt. alumina) had been initially calcined at about 800° F., and exposed to the atmosphere for an extended period of time.

A 2.5-g. portion of this calcined silica-alumina was used to treat 5 cc. of a hydrocarbon mixture consisting of 28.8% vol. toluene and 71.2% vol. isooctane. The liquid which was not adsorbed by the silica-alumina gel was analyzed by the refractive-index technique and found to contain 26.2% vol. toluene. The liquid adsorbed on the silica-alumina gel consisted of a hydrocarbon mixture substantially enriched in toluene content.

Several portions of the silica-alumina gel were then treated further in accordance with this invention, as described in the following examples, and used in the treatment of toluene-isooctane mixture to separate toluene therefrom.

*Example 1*

A solution of 1.2 g. lithium hydroxide (0.05 mol of lithium, or 13% of the stoichiometric requirement) was added to 100 g. of the above-described silica-alumina gel.

The resulting mixture was dried for about 20 hours at 230° F., leaving lithium hydroxide on the gel surfaces. The gel was then heated for 6 hours at 975° F. until reaction was complete. The finished composition contained 0.35% lithium. Before addition of lithium, the silica-alumina adsorbent had a surface-area index of 280 m.$^2$/g. The chemical incroporation of lithium in accordance wtih this invention increased the surface-area index to 353 m.$^2$/g.

The surface-area indexes of the adsorbent gels in this and the following examples were determined by the Aromatic Adsorption-Index Technique (described in A.P.I. Proceedings, vol. 27 (III), 1947, pp. 38–46) which gives a dimensionless relative surface measurement which is convertible to a surface-area index in square meters per gram.

A 2.5-g. sample of the treated silica-alumina adsorbent was used to treat 5 cc. of a mixture of toluene and isooctane of the same composition used in testing the efficiency of the untreated gel. The decrease in toluene concentration produced by selective adsorption of toluene on the silica-alumina adsorbent was 32% greater with the treated gel than with the untreated gel.

Example II

A 100-g. portion of the silica-alumina gel, as used in Example I, was slurried into a solution of 4.7 g. of berryllium nitrate trihydrate and 200 cc. of water. This amount of berryllium nitrate trihydrate contained 0.025 mol beryllium, or 13% of the stoichiometric requirement for reaction with the reactive hydroxyls in the gel. To the slurry were added 100 cc. of a solution containing 3.4 cc. of 28% ammonium hydroxide in water. The mixture was agitated while adding the ammonium hydroxide and for ½ hours thereafter. Then the slurry was filtered and the filter cake was dried for about 20 hours at 230° F. One half of the dried material was heated at 750° F. for 6 hours. The surface-area index of the finished product was 407 m.$^2$/g. The other half of the dried material was heated at 975° F. for 6 hours. The surface-area index of this product was 368 m.$^2$/g.

A 2.5-g. sample of the treated silica-alumina adsorbent (which was heated at 750° F.) was used as an adsorbent in the separation of toluene from a mixture of toluene and isooctane as previously described. This sample of the treated siilca-alumina was mixed with 5 cc. of a liquid mixture of toluene and isooctane of the same composition as was used in testing the untreated gel. The reduction in toluene concentration in the liquid resulting from adsorption of toluene on this adsorbent was 52% greater than with the untreated gel.

Example III

A solution of 49.1 g. of beryllium nitrate trihydrate (0.262 mol of beryllium, or 39% of the stoichiometric requirement) in 350 cc. of water was aded to a 350-g. portion of the silica-alumina gel as used in Example I, with constant mixing. The mixture was dried for about 20 hours at 230° F. and then a portion was heated for 6 hours at 975° F. The resulting product had a surface-area index of 452 m.$^2$/g.

A 2.5-g. portion of the treated silica-alumina adsorbent was used to treat 5 cc. of the liquid toluene-isooctane mixture as used in the previous example. The reduction in toluene concentration in the liquid, resulting from adsorption of toluene on the silica-alumina, was 71.5% greater than when the untreated gel was used.

Example IV

A 100-g. portion of the silica-alumina gel, as used in Example I, was slurried into a solution of 6.4 g. of magnesium nitrate hexahvdrate (0.025 mol of magnesium, or 13% of the stoichiometric requirement) in 200 cc. of water. A 100-cc. portion of solution containing 3.4 cc. of 28% ammonium hydroxide in water was then added to the slurry with agitation, and agitation was continued for ½ hour after addition was complete. The slurry was filtered, the wet mass was dried for about 20 hours at 230° F., and then was heated for 6 hours at 975° F. The finished product, containing 0.61% wt. combined magnesium, had a surface-area index of 342 m.$^2$/g.

A 2.5-g. sample of the treated silica-alumina adsorbent was used to treat a 5 cc. sample of the toluene-isooctane mixture used in the previous example. The reduction of toluene concentration in the mixture was 32% greater using the treated adsorbent than when the untreated gel was used.

Example V

A solution of 1.0 g. of boric acid (0.016 mol boron, or 8.3% of the stoichiometric requirement) in 100 cc. of water was added to 100 g. of the silica-alumina as used in Example I. The mixture was dried for about 20 hours at 230° F. and heated for 6 hours at 975° F. The resulting adsorbent composition, having a boron content of 0.18%, had a surface-area index of 342 m.$^2$/g.

A 2.5-g. sample of the treated adsorbent was used to treat 5 cc. of the toluene-isooctane mixture as used in the previous examples. The reduction in toluene concentration in the liquid effected by adsorption of toluene on the silica-alumina was 32% greater using the treated adsorbent than when the untreated gel was used.

Example VI

A 100-g. portion of the silica-alumina gel, as used in Example I was slurried into a solution of 3.3 g. of zirconyl nitrate dihydrate (0.012 mol zirconium, or 6.2% of the stoichiometric requirement) in 200 cc. of water. Then 100 cc. of an aqueous solution containing 3.4 cc. of 28% ammonium hydroxide was added, with constant agitation continued for an additional ½ hour period. The resulting slurry was filtered, the filter cake was dried for about 20 hours at 230° F., and was heated at 975° F. for 6 hours. The resulting adsorbent composition, containing 1.41% wt. zirconium, had a surface-area index of 378 m.$^2$/g.

A 2.5-g. portion of the treated silica-alumina was used to treat a 5-cc. sample of the toluene-isooctane mixture used in the previous examples. The decrease in toluene concentration in the liquid resulting from adsorption of toluene on the silica-alumina was 56.5% greater using the treated silica-alumina of this example than was obtained using the untreated silica-alumina.

Example VII

When a 100-g. sample of F-10 activated alumina is treated with a solution of beryllium nitrate trihydrate containing about 40% of the stoichiometric requirement for reaction with hydroxyl groups in the gel, and is heated to 975° F. for about 6 hours, the resulting product has a surface-area index which is greater than the untreated material. When a portion of the treated alumina is used in treating a mixture of toluene and isooctane as used in the other examples, the reduction in toluene concentration in the liquid is substantially greater than is obtained using activated alumina which has not received this treatment.

Example VIII

A 100-g. portion of silica gel which has been dried at a temperature of 500°–800° F. is reacted with beryllium, in the form of beryllium nitrate trihydrate, as in Example III. The beryllium nitrate solution is added to the silica and the resulting slurry dried at 230° F. and heated for 6 hours at 975° F. The resulting product has a surface-area index which is greater than the untreated silica gel and has a substantially higher capacity for removal of aromatic hydrocarbons, and other polar organic compounds, from mixtures of polar and non-polar organic compounds.

In using any of the adsorbents prepared in accordance with the foregoing examples, standard adsorption process techniques are utilized. The adsorbents which are prepared as previously described, having enhanced surface-area indexes and adsorptive capacities for polar organic liquids, are substituted for similar adsorbent gels in an adsorption process. For example, a sample of silica-alumina, prepared in accordance with any of the foregoing examples, is placed in an adsorption vessel and contacted with a mixture of benzene or toluene and aliphatic hydrocarbons until the adsorbent is saturated. Then the residual hydrocarbons are flushed from the adsorber, and the adsorbate is recovered by applying heat and reduced pressure, using an inert stripping gas such as hot nitrogen or helium. The hydrocarbons which are eluted from the adsorbent gel are greatly enriched in aromatic content and may be passed to another adsorber for further enrichment. Alternatively, the adsorbate may be stripped from the adsorbent using hot hydrocarbon vapors, or by using steam or other desorbent materials well known in the art. The improved adsorbent gels used in this process may be substituted for the conventional adsorbent gels used in other adsorption processes wherein the process techniques are more complicated and require additional equipment for carrying out the process.

While the modified adsorbent gels used in this process are especially useful in the separation of aromatic hydrocarbons, such as benzene, toluene, xylene, naphthalene, etc., from admixture with aliphatic hydrocarbons, these gels are also useful in the separation of other polar organic compounds from non-polar organic compounds.

The foregoing examples of the preparation of our improved adsorbent gel compositions, and of our improved adsorption process using such adsorbents, are given as examples of the utility of our process. We wish it understood, however, that said examples are not considered to limit the invention and that within the scope of the appended claims, the invention may be practiced otherwise than as specifically described herein.

The embodiments of the invention in which an exclusive property or privilege is claimed are defined as follows:

1. A method of separating aromatic hydrocarbons from admixture with aliphatic hydrocarbons which comprises contacting the liquid mixture with a solid adsorbent selected from the group consisting of alumina, silica, and silica-alumina, which has been prepared by treating the adsorbent, in the form of a hydrogel which has been pre-dried by heating to a temperature at which only the reversible water content thereof is removed, with 1–100% of the stoichiometric amount of a compound, selected from the group consisting of oxides, hydroxides, and nitrates of lithium, beryllium, magnesium, zirconium, and boron, required to react with hydroxyl groups in the adsorbent, followed by heating the impregnated gel to a temperature of about 500°–1000° F. until reaction with hydroxyl groups in the gel is complete as evidenced by cessation of evolution of water or acid vapors, said gel being characterized by increased surface-area index and increased adsorptive capacity for aromatic hydrocarbons, and recovering the aromatic hydrocarbon adsorbed on the gel.

2. A method in accordance with claim 1 in which the adsorbent is alumina.

3. A method in accordance with claim 1 in which the adsorbent is silica-alumina.

4. A method in accordance with claim 1 in which the adsorbent is silica.

5. A method in accordance with claim 1 in which the reactant compound used in preparation of the adsorbent is a beryllium compound.

6. A method in accordance with claim 1 in which the reactant compound used in preparation of the adsorbent is a lithium compound.

7. A method in accordance with claim 1 in which the reactant compound used in preparation of the adsorbent is a magnesium compound.

8. A method in accordance with claim 1 in which the reactant compound used in preparation of the adsorbent is a zirconium compound.

9. A method in accordance with claim 1 in which the reactant compound used in preparation of the adsorbent is a boron compound.

References Cited in the file of this patent

UNITED STATES PATENTS

| | | |
|---|---|---|
| 2,340,935 | Connolly | Feb. 8, 1944 |
| 2,564,717 | Olsen | Aug. 21, 1951 |
| 2,926,135 | Engel et al. | Feb. 23, 1960 |

OTHER REFERENCES

Sachanen, "The Chemical Constituents of Petroleum," Reinhold Publishing Corp., 1945 (pages 228–230 and 425).

Klemm et al.: "Journal of Organic Chemistry," March 1959, volume 24, pages 1468–1477.